United States Patent [19]

Matsushita

[11] Patent Number: 4,896,756
[45] Date of Patent: Jan. 30, 1990

[54] APPARATUS FOR PREVENTING HEAT DAMAGE IN AN ELECTROMAGNETIC CLUTCH

[75] Inventor: Takashi Matsushita, Isesaki, Japan

[73] Assignee: Sanden Corporation, Gunma, Japan

[21] Appl. No.: 242,307

[22] Filed: Sep. 9, 1988

Related U.S. Application Data

[62] Division of Ser. No. 10,466, Feb. 3, 1987, Pat. No. 4,799,578.

[30] Foreign Application Priority Data

Feb. 3, 1986 [JP]  Japan .................................. 61-14356
Feb. 28, 1986 [JP] Japan .................................. 61-29875

[51] Int. Cl.$^4$ ............................................. F16D 27/10
[52] U.S. Cl. .................................. 192/84 C; 192/82 T; 335/279
[58] Field of Search ................ 192/84 C, 82 T, 30 W, 192/109 R, 84 A, 84 B, 101, 107 M; 335/146, 208, 217, 220, 279

[56] References Cited

U.S. PATENT DOCUMENTS

| | | | |
|---|---|---|---|
| 2,919,777 | 1/1960 | Walter ................... | 192/84 C |
| 3,917,041 | 11/1975 | Walberg ................. | 192/82 T X |
| 4,236,621 | 12/1980 | Mukai et al. ........... | 192/82 T |
| 4,243,128 | 1/1981 | Shirai .................... | 192/84 C X |
| 4,266,211 | 5/1981 | Ulanet .................... | 335/208 |
| 4,414,520 | 11/1983 | Ruuth .................... | 335/208 |
| 4,493,407 | 1/1985 | Newton ................... | 192/84 C |

FOREIGN PATENT DOCUMENTS

| | | | |
|---|---|---|---|
| 56-138529 | 10/1981 | Japan ..................... | 192/84 C |
| 59-13137 | 1/1984 | Japan ..................... | 192/82 T |
| 59-103033 | 6/1984 | Japan ..................... | 192/82 T |
| 59-144825 | 8/1984 | Japan ..................... | 192/84 C |

*Primary Examiner*—Leslie A. Braun
*Assistant Examiner*—Richard M. Lorence
*Attorney, Agent, or Firm*—Banner, Birch, McKie & Beckett

[57] ABSTRACT

An electromagnetic clutch according to the invention includes a first rotatable member having an axial end plate of magnetic material and a second rotatable member. The second rotatable member includes a drive shaft, and a hub mounted on an end of the shaft. An annular armature plate is disposed on an outer peripheral portion of the hub facing the axial end plate of the first rotatable member with an axial air gap therebetween. An electromagnetic device is disposed within the first rotatable member for attracting the armature plate to the axial end surface of the first rotatable member. The armature plate is elastically connected with the hub by a plurality of leaf springs and is made of materials with a low Curie point. Meltable elements are disposed on the armature plate to define the axial air gap between the first rotatable member and the armature plate. When the elements are heated sufficiently due to frictional heat, they melt and the air gap between the first rotatable member and the armature plate increases to a point where the clutch cannot be engaged. If the temperature exceeds the Curie point, the magnetic property of the armature decreases rapidly and the armature separates from the rotor and remains separated until the meltable elements are replaced.

1 Claim, 1 Drawing Sheet

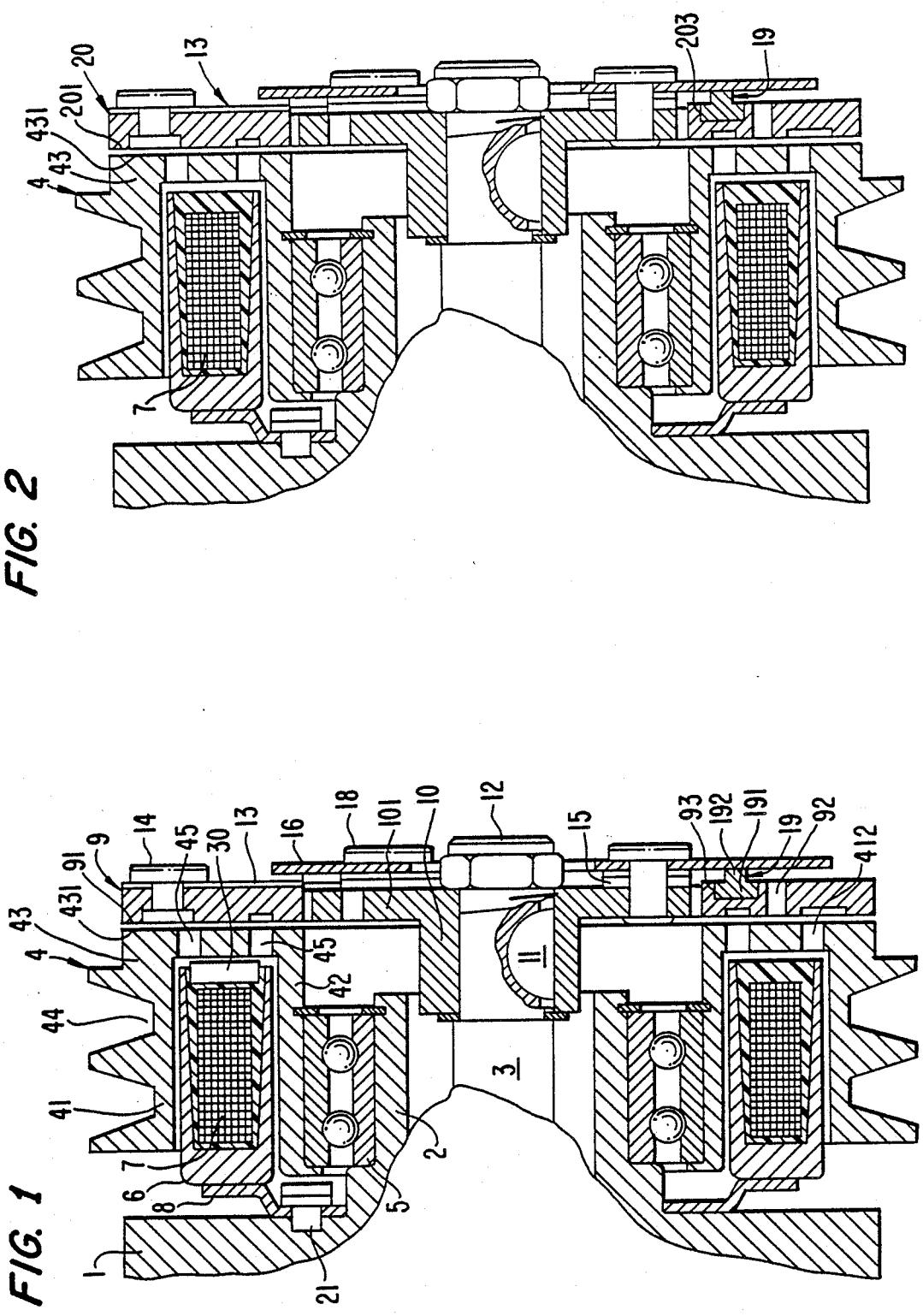

APPARATUS FOR PREVENTING HEAT DAMAGE IN AN ELECTROMAGNETIC CLUTCH

This application is a division of application Ser. No. 010,466, filed Feb. 3, 1987 now U.S. Pat. No. 4,799,578.

BACKGROUND OF THE INVENTION

1. Field of The Invention

This invention relates to an electromagnetic clutch for use in a compressor for an automotive air conditioning system, and more particularly to an electromagnetic clutch that includes an apparatus for preventing permanent heat damage to the clutch.

2. Description Of The Prior Art

Generally, a compressor for an automotive air conditioning system is driven by the engine and its operation is controlled by an electromagnetic clutch. If the rotating motion of the compressor is suddenly stopped, e.g., by locking of the wraps, the compressor should be quickly disconnected from the engine. Since the compressor may be driven by a belt which also drives other equipment such as an alternator, etc., it is necessary that the movement of the other equipment is not affected when the compressor is stopped.

Furthermore, if the rotation of the compressor is suddenly stopped and the electromagnetic clutch is still engaged to drive the compressor, a sliding frictional contact is created between the rotor and the armature plate of the electromagnetic clutch. Frictional heat is generated by this sliding frictional contact, which can cause the seizure of the rotor and armature plate. The bearing which rotatably supports the rotor may also be damaged by such frictional heat. It is therefore desirable to quickly disengage the electromagnetic clutch and to prevent the clutch from being reengaged until the compressor has been repaired.

One possible solution to resolve the above noted problems is to use a temperature fuse. A temperature fuse is disposed on the rotor of the electromagnetic clutch adjacent to the frictional surface of the rotor and armature plate and stops the operation of the clutch by melting itself.

However, it is impossible to directly dispose a temperature fuse on the frictional surface of a rotor, and therefore there is a large difference between the actual temperature on the frictional surface of the rotor and the temperatures detected by the fuse. Thus, a temperature fuse is not able to precisely control the operation of an electromagnetic clutch in response to the temperature of a frictional surface of the rotor. Also, since the temperature fuse is placed on the outer portion of the compressor, the temperature fuse may detect the heating of the compressor and unnecessarily cease the operation of the electromagnetic clutch.

Furthermore, since a temperature fuse will cease the operation of the clutch by melting itself, it is necessary to replace the fuse in order to again use the electromagnetic clutch. Since the temperature fuse is normally disposed within the hollow space of the rotor, it is necessary to remove the clutch from the compressor to replace the fuse, complicating maintenance of the clutch.

SUMMARY OF THE INVENTION

It is the primary object of this invention to provide an electromagnetic clutch which has a mechanism for protecting a compressor from damage due to locking or other sudden stoppage of the mechanism.

It is another object of this invention to provide an electromagnetic clutch with a protecting mechanism that is easy to maintain.

It is a further object of this invention to provide an electromagnetic clutch that can quickly respond to a sudden temperature rise and efficiently disconnect the compressor to prevent permanent heat damage.

An electromagnetic clutch according to the invention includes a first rotatable member having an axial end plate of magnetic material and a second rotatable member. The second rotatable member includes a drive shaft, and a hub mounted on an outer terminal end of the drive shaft. An annular armature plate is disposed on the outer peripheral portion of the hub facing the axial end plate of the first rotatable member with an axial air gap therebetween. An electromagnetic device is disposed within the first rotatable member for attracting the armature plate to the axial end surface of the first rotatable member. The armature plate is elastically connected with the hub by a plurality of leaf springs. A self-return type temperature switch is fixedly disposed within the first rotatable member and closely placed on the axial end plate of the first rotatable member for controlling the energization of the electromagnetic device in accordance with the temperature on the axial end plate. The temperature switch will disconnect the electromagnetic device if a predetermined temperature is exceeded. Elements formed of meltable material are disposed on the armature plate to determine the axial air gap between the first rotatable member and the armature plate. When the elements are heated due to frictional heat generated when the compressor locks, they will melt and the air gap between the first rotatable member and the armature plate will increase to a point where the clutch cannot be engaged. Therefore, if the temperature switch reconnects the electromagnetic device, the clutch will still not function, preventing any further damage to the device.

In a second embodiment of the invention, the armature plate is made of materials that have a low Curie point. This eliminates the need for a temperature switch since the magnetic properties of the armature plate will decrease at high temperatures resulting in the clutch being disengaged.

Further objects and features of this invention will be understood from the following description of this invention while referring to the annexed drawings.

BRIEF DESCRIPTION OF THE DRAWINGS

FIG. 1 is a cross-sectional view of an electromagnetic clutch in accordance with one embodiment of the invention.

FIG. 2 is a cross-sectional view of an electromagnetic clutch in accordance with a second embodiment of the invention.

DETAILED DESCRIPTION OF THE PREFERRED EMBODIMENTS

Referring to FIG. 1, which illustrates an electromagnetic clutch according to a first embodiment of this invention, a clutch is shown which is assembled on a compressor for an automotive air conditioning system. Compressor housing 1 is provided with a tubular extension 2 surrounding a drive shaft 3 of the compressor. Drive shaft 3 is rotatably supported in compressor housing 1 by a bearing (not shown).

Rotor 4 is rotatably supported on tubular extension 2 through bearing 5 which is mounted on the outer surface of tubular extension 2. Rotor 4 is made of magnetic material, such as steel, and comprises an outer annular cylindrical portion 41, inner annular cylindrical portion 42 and axial end plate portion 43 connecting the outer and inner cylindrical portions 41, 42 at an axial forward end. An annular U-shaped cavity is thus defined between portions 41, 42, and 43. Annular V-belt groove 44 is formed on the outer peripheral surface of outer cylindrical portion 41 for receiving a V-belt for coupling the compressor to the engine of the automobile (not shown). Axial end plate portion 43 has a frictional surface 431 formed on its outer surface and includes one or more concentric slits 45 to define a plurality of annular or arcuate pieces.

Electromagnetic coil 7 is disposed in the annular cavity of rotor 4. Coil 7 is contained within annular housing 6 having a U-shaped cross section. Housing 6 is fixed to a supporting plate 8, which is secured to the axial end surface of the compressor by a plurality of rivets 21. Coil housing 6 is thus maintained within the cavity without contacting rotor 4. A self-return type temperature switch 30 is disposed on an axial end surface of housing 6 closely adajacent to inner end plate portion 43 so as to be able to easily detect frictional heat.

Hub 10 is disposed on the terminal end of drive shaft 3 and secured to drive shaft 3 by nut 12 and key 11. Hub 10 is provided with flange portion 101 extending radially outwardly from the axial end portion of hub 10. Annular armature plate 9 is concentrically disposed around the outer surface of hub 10 so as to face axial end plate portion 43 of rotor 4 with a predetermined axial air gap. Armature plate 9 also comprises frictional surface 91 to face the frictional surface 431 of rotor 4 and is provided with one or more slits 92 to define a plurality of annular or arcuate magnetic pieces. Armature plate 9 is elastically connected to flange portion 101 of hub 10 through a plurality of leaf springs 13. One end portion of each leaf spring 13 is secured on the outer end surface of armature plate 9 by rivet 14. The other end portion of leaf spring 13 is secured on the axial end surface of flange portion 101 of hub 10 by rivet 18 together with a stopper plate 16 and washer 15.

A plurality of equiangularly positioned depressions 93 are formed on the outer axial end surface of armature plate 9. Elements 19 are formed of meltable material, e.g., lead or resin with heat plasticity, and are disposed in depressions 93 and comprise a pedestal portion 191 and projecting portion 192. Projecting portion 192 of element 19 extends axially outwardly from pedestal portion 191 and contacts the inner surface of stopper plate 16. Therefore, armature plate 9, which is elastically supported with flange portion 101 through leaf springs 13, is urged toward the frictional surface 431 of axial end plate portion 43 by elements 19 to provide an initial deformation or bias to leaf springs 13. This defines the predetermined axial air gap between rotor 4 and armature plate 9. This axial air gap is determined so that armature plate 9 can be attracted to rotor 4 when electromagnetic coil 7 is energized.

In the above construction of the electromagnetic clutch, if coil 7 is not energized, armature plate 9 is separated from rotor 4 by the recoil strength of leaf springs 13.

When electromagnetic coil 7 is energized, magnetic flux is induced and flows through a closed loop comprisign coil housing 6, rotor 4, and armature plate 9. Armature plate 9 is thus magnetically attracted to frictional surface 431 of rotor 4 and springs 13 are bent in the axial direction. Therefore, the rotating movement of the engine is transmitted to drive shaft 3 of the compressor through rotor 4, armature plate 9, leaf springs 13, and hub 10. When the compressor becomes locked while armature plate 9 is in contact with rotor 4, frictional surface 431 of axial end plate portion 43 of rotor 4 slides on the frictional surface 91 of armature plate 9. Frictional heat is thus caused by this sliding frictional contact between rotor 4 and armature plate 9. Rotor 4 and armature plate 9 are heated rapidly, and if the frictional heat on armature plate 4 exceeds the melting point of elements 19, elements 19 will melt. Also, if the frictional heat exceeds a predetermined temperature, temperature switch 30 disconnects the flow of current to coil 7. Accordingly, armature plate 9 separates from the frictional surface 431 of axial end plate portion 43 of rotor 4 by the recoil strength of leaf springs 13. At this time, armature plate 9 is in direct contact with the axial end surface of stopper plate 16 since elements 19 have melted, and the axial gap between the frictional surface 431 of rotor 4 and the frictional surface 91 of armature plate 9 is a large enough distance that armature plate 9 cannot be attracted to the frictional surface 431 of rotor 4 is electromagnetic coil 7 is energized. Thus, even though temperature switch 30 is a self-return type switch, i.e., since it will reconnect the electromagnetic device after the temperature decreases, armature plate 9 will not become engaged with the frictional surface of rotor 4.

Referring to FIG. 2, an electromagnetic clutch according to a second embodiment of this invention is shown. The construction of the electromagnetic clutch shown in FIG. 2 is similar to that of the electromagnetic clutch shown in FIG. 1 but does not include self-return type temperature switch 30 and the armature plate is made of materials with a low Curie point.

The operation of the electromagnetic clutch shown in FIG. 2 is described below. When the compressor locks, the frictional surface 431 of rotor 4 slides on frictional surface 201 of armature plate 20. Frictional heat is thus generated by the sliding frictional contact of rotor 4 and armature plate 20. Therefore, rotor 4 and armature plate 20 heat rapidly, and if the frictional heat exceeds the melting point of elements 19, elements 19 will melt. If the temperature exceeds the Curie point, the magnetic property of armature plate 20 decreases rapidly. Thus, the attractive force between frictional surface 431 of rotor 4 and frictional surface 201 of armature plate 20 decreases rapidly. Accordingly, armature plate 20 separates from rotor 4 due to the recoil strength of leaf springs 13. At this time, the gap between the frictional surface 431 of rotor 4 and frictional surface 201 of armature plate 20 cannot be attracted to rotor 4 even though coil 7 can be energized. Thus, if the magnetized properties of armature plate 20 are restored by decreasing the temperature, armature plate 20 is still not attracted to the frictional surface of rotor 4, and the rotation of rotor 4 cannot be transmitted to armature plate 20.

According to the above described invention, if locking occurs, the compressor will be quickly and permanently disconnected from the engine, until the compressor is repaired and elements 19 are replaced placed. Unlike temperature fuses used in the prior art, it is not necessary to dismantle the electromagnetic clutch in order to replace the meltable elements 19. These elements are conveniently disposed on the outer surface of armature plate 9 and may be easily replaced. By combining these meltable elements with either a self-return type temperature switch or an armature plate made of materials with a low Curie point, the clutch can be quickly disengaged thus preventing permanent damage due to frictional heat and can be easily repaired since the meltable elements are readily accessible.

Whereas preferred embodiments of the invention have been described above, these embodiments are for illustrative purposes only and many changes are possible without departing from the spirit of the invention or the scope of the appended claims.

I claim:

1. In an electromagnetic clutch including a first rotatable member having an axial end plate of magnetic material, a second rotatable member, an annular armature plate of magnetic material connected to said second rotatable member so that said annular armature plate is capable of limited axial movement, said annular armature plate facing said axial end plate of said first rotatable member with an axial air gap therebetween and an electromagnetic device associated with said first rotatable member and operable to attract said armature plate into contact with said axial lend plate such that the rotation of said first rotatable member can be transmitted to said second rotatable member through said armature plate when said electromagnetic means is activated, the improvement comprising said armature being formed of materials with a predetermined Curie point and wherein one or more meltable elements are disposed on an axial end surface of said armature plate, wherein an increase in temperature of said clutch beyond said predetermined point, causes a decrease in the magnetic property of said armature, whereby the attractive force between said first rotable member and said armature will be decreased to thereby render said electromagnetic clutch inoperable.

* * * * *